Dec. 26, 1950 G. F. SARAZIN 2,535,958
CENTRIFUGAL PENDULUM VIBRATION DAMPER
Filed July 7, 1948 2 Sheets-Sheet 2

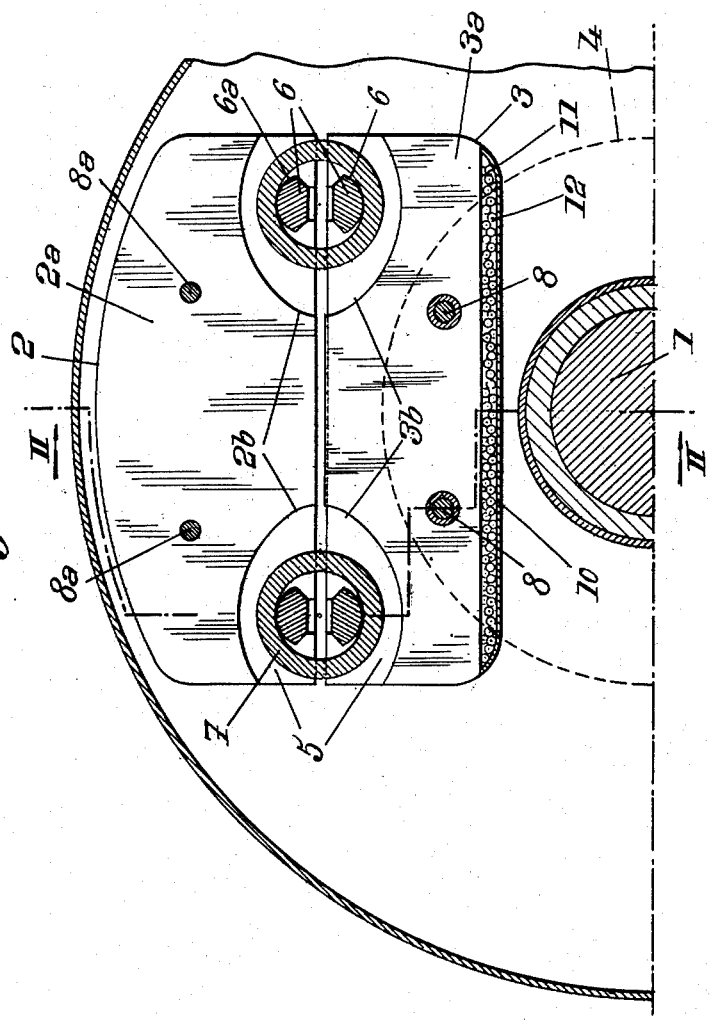

INVENTOR
Gilles Francois Sarazin
BY
Bailey, Stephens & Huettig
ATTORNEYS

Patented Dec. 26, 1950

2,535,958

UNITED STATES PATENT OFFICE 2,535,958

CENTRIFUGAL PENDULUM VIBRATION DAMPER

Gilles Francois Sarazin, Paris, France

Application July 7, 1948, Serial No. 37,438
In France July 8, 1947

5 Claims. (Cl. 74—574)

The present invention relates to centrifugal pendulum vibration dampers, these apparatus essentially including pendular masses eccentrically suspended to a rotating body and adapted to enter into oscillation, under the effect of the vibration to be damped, in phase opposition therewith.

These pendular masses must, in order to have a maximum efficiency, be mounted in such manner as to be able to oscillate with the minimum possible friction. For this purpose, it has already been proposed to connect them with their rotating support through roller devices, preferably through the use of rolling bodies bearing on the one hand on roller tracks carried by the rotating support and on the other hand on roller tracks carried by the pendular mass.

According to some embodiments already proposed, these rolling bodies had the shape of elements such as rings including inner rolling surfaces, these elements being subjected to pulling stresses under the effect of the centrifugal force and of the tangential accelerations to which the masses are subjected. The maximum number of these elements was fixed to two or four, but they had the disadvantage of being deformable due to their very shape, unless they were made very heavy (this being, however, undesirable for operational reasons), or provided with complicated and costly stiffening devices. Therefore, up to the present time, it was found preferable to make use of cylindrical rolling bodies having external rolling surfaces.

The chief object of the present invention is to provide an apparatus of the kind in question, i.e. including, for rolling suspension of the pendular mass, rolling bodies with inner rolling surfaces, which is better adapted to meet the requirements of practice and in particular which is both rigid and of light weight.

Preferred embodiments of my invention will be hereinafter described with reference to the accompanying drawings, given merely by way of example and in which:

Figs. 1 and 2 show respectively in cross section on the line I—I of Fig. 2 and in longitudinal section on the line II—II of Fig. I, a torsional vibration damper made according to my invention;

Figure 3:
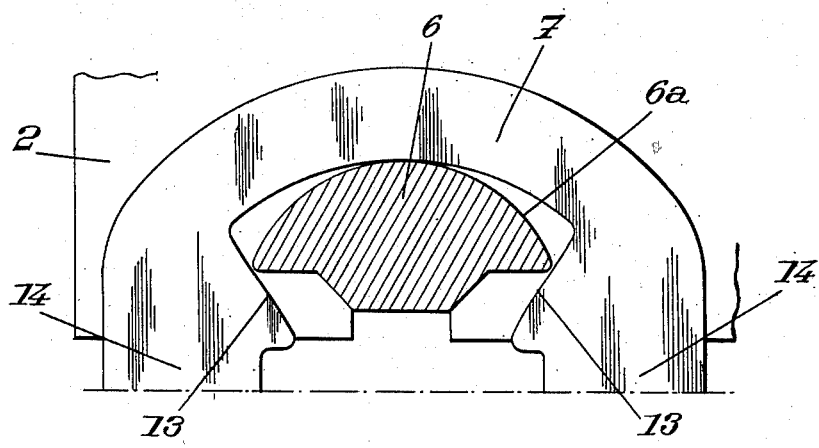
Fig. 3 shows, on a larger scale, another feature of my invention applicated to the elements of the damper shown by Figs. 1 and 2.

The drawings show a torsional vibration damper for a rotary shaft 1, which includes two pendular mass elements 2, diametrally opposed, each connected through a bifilar suspension with a rotary supporting element 3 rigid with a plate 4 carried by said shaft.

I constitute each pendular mass element 2 and each supporting element 3 by a pile of plates, advantageously of metal, for instance of sheet metal, extending at right angles to the axis of rotation of said shaft 1 (I have designated, on the drawing, respectively by 2a and 3a the plates that constitute the pendular mass element and the rotary supporting element, the whole of said mass element being designated by reference number 2 and the whole of said supporting element by reference number 3.

I provide, in some of these plates 2a and 3a, at least one notch (two notches 2b and 3b respectively in the example shown) whereby after assembly of at least some of these plates between plates without notches, the adjacent faces of pendular mass 2 and rotary support 3 are provided with a plurality of recesses 5 located opposite one another respectively and separated by the partitions formed by the plates which have no notches therein. For instance, I may, as shown by the drawings, provide alternately one plate having notches formed therein and one plate without notches, both for mass 2 and for support 3.

I further provide, across at least some and preferably all the partitions and recesses of each element, to wit pendular mass 2, on the one hand and rotary support 3 on the other hand, a rod 6 provided, in the recesses through which it passes, with convex rolling tracks 6a, the rod having for instance, a dovetailed cross section.

I connect mass 2 with support 3 through elementary rings 7 housed with a certain play in the corresponding recesses 5 and passing each around the rolling tracks 6a of the rods 6 carried respectively by said mass and said support.

And finally, I provide means for preventing radial displacements of the notched plates which are not retained by rods 6 with respect to the plates without notches which are anchored by said rods.

Thus, I may secure together the plates 3a which constitute the rotary support 3 so as to prevent radial displacement of those of said plates which are provided with notches by making use for this purpose, of the means for fixing said support to plate 4. Said means are, for instance, constituted by two tie bolts 8 with riveted heads extending both through plates 3a, disc 4, and further, advantageously, the walls of an annular casing 9 which is preferably provided for protecting the elements of the damper in particular when this damper is provided at the end of shaft 1 and of the engine casing.

As for plates 2a which constitute mass 2, they may be secured with respect to one another by means of rivets 8a extending throughout the pile of plates in question.

Such a system has, among others, the following advantages:

The dimensions (and therefore the weight) of rod 6 and rings 7 can be reduced due to the distribution of the stresses over a multiplicity of rolling tracks;

The construction is particularly simple, the essential elements of the damper being obtained by punching and assembled by mere riveting.

Nothing has been said, in what precedes, about the means to be provided for ensuring lubrication of the movable parts of the damper.

When said damper is housed inside the engine casing, I can rely upon the oil mist existing in this chamber to produce lubrication.

On the contrary, when said damper is disposed inside a separate casing, it will be necessary to provide special lubricating means for introducing into said casing a lubricant such for instance as paraffin oil or, better, graphite powder which can, then, be advantageously utilized in the form of grains.

For this purpose, I give the plates 3a provided with notches a height smaller than that of the other plates which constitute rotary support 3, and I apply a closure plate 10 against the edges of plates 3a adjacent to shaft 1.

I thus form, at the base of said rotary support, a plurality of chambers 11 in each of which can be housed, when the apparatus is being assembled, a reserve of graphite grains 12 which, under the effects of the shocks they undergo, are disintegrated into very small fragments which infiltrate between plates 3a for instance, through interstices provided between said plates, so as finally to reach the roller tracks to be lubricated.

According to still another feature of my invention, those of plates 3a which are provided with notches are made of a non-metallic material capable of reducing noise. Compressed fiber is perfectly well suited for this purpose.

Furthermore, the plates 3a made of such a material are advantageously shaped in such manner that, at least, at one point, they project slightly from the plates unprovided with notches along the face of support 3 which is opposite to the mass.

Thus, if, for the pendular stroke of maximum amplitude, the mass comes to strike the support, the shocks take place between the mass and the non-metallic projecting portions of the plates 3a provided with notches. The shock is thus substantially damped and produces much less noise than if it had taken place between metallic parts.

According to another supplementary feature, each of the rings 7 is provided, on either side of the portion of each of its two rolling surfaces that comes into contact with the corresponding rolling track 6a for the maximum pendular amplitude that is chosen, with surfaces 13 which constitute the envelope of rod 6 on which is provided the roller track 6a, i. e. surfaces capable of remaining constantly tangent to said rod, barring operational play, in the course of the pendular oscillation, whereby any accidental rotation of the rings is avoided.

It is then possible to limit each of the rolling surfaces of the rings to the zone corresponding to the maximum amplitude and to connect together the two opposed rolling surfaces of a given ring through rectilinear portions 14 which are then subjected to pure traction and are much more rigid than the arc-shaped portions, which, according to the embodiment of Fig. 1, interconnect the useful portions of the rings, that is to say their portions corresponding to the part of the rolling surfaces that is actually utilized.

In a general manner, while I have, in the above description, disclosed what I deem to be practical and efficient embodiments of my invention, it should be well understood that I do not wish to be limited thereto as there might be changes made in the arrangement, disposition and form, of the present invention as comprehended within the scope of the accompanying claims.

What I claim is:

1. A vibration damper for use on a rotating body which comprises, in combination, rotary supporting elements carried by said body, an oscillating pendular mass element movably mounted on each supporting element respectively, each element being provided with two sets of recesses, each set forming a row parallel to the rotation axis of said body, the recesses of each supporting element being located opposite the recesses of the corresponding pendular mass element, respectively, two rods carried by every element parallel to said axis, extending each across the recesses of the respective rows of recesses of said element, the portions of said rods in said last mentioned recesses having convex rolling outer surfaces, and rings passing each through one of said recesses of a pendular mass element and the opposite located recess of the corresponding supporting element, said ring having rolling inner surfaces in engagement with the convex rolling surfaces of the two rods passing through said two last mentioned recesses respectively, so as to roll with respect to both of said rods.

2. A vibration damper for use on a rotating body which comprises, in combination, rotary supporting elements carried by said body, an oscillating pendular mass element movably mounted on each supporting element respectively, each element being constituted by a plurality of plates at right angles to the rotation axis of said body and piled against one another, some of these plates being notched so as to constitute between the plates without notches two sets of recesses each forming a row parallel to said axis, the notched plates of one pendular mass element being located opposite the notched plates of the corresponding supporting element, two rods carried by each element parallel to said axis extending each across the notches of each row of notches of said last mentioned element, the portions of said rods in said notches having convex rolling surfaces, and rings extending each freely through two opposite notches of a pendular mass element and a supporting element, respectively, each ring having inner rolling surfaces in engagement with the convex rolling surfaces of the two rods passing through said two last mentioned notches respectively, so as to roll with respect to both of said rods.

3. A vibration damper according to claim 3 in which some of the plates of each supporting element extend farther toward said axis as the other plates of the same element so as to form recesses between said first mentioned plates, a closure plate closing said last mentioned recesses, and granular graphite in said last mentioned recesses for lubrication of the damper.

4. A vibration damper according to claim 2 in which at least some of the plates of each supporting element are made of a non-metallic material, said non-metallic plates being mounted to come into contact with the plates of the corresponding pendular mass element for maximum amplitude oscillations of said mass element, so as to reduce noise.

5. A vibration damper for use on a rotating body which comprises, in combination, rotary supporting elements carried by said body, an oscillating pendular mass element movably mounted on each supporting element, respectively, each element being provided with two recesses, the recesses of each pendular mass element being located opposite the recesses of the corresponding supporting element, respectively, two rods carried by each element, parallel to said axis, extending each across one of the two recesses of said element, the portions of said rods in said recesses having convex rolling surfaces, and two rings passing each through one recess of a pendular mass element and the opposite located recess of the corresponding supporting element, said rings having inner rolling surfaces in engagement with the convex rolling surfaces of the two rods extending through said two last mentioned recesses, respectively, so as to roll with respect to both of said rods, the inner surfaces of each ring on either side of said rolling surface thereof being so shaped as to remain constantly tangent to said rods, whereby accidental rotation of said rings is avoided.

GILLES FRANCOIS SARAZIN.

REFERENCES CITED

The following references are of record in the file of this patent:

UNITED STATES PATENTS

| Number    | Name    | Date           |
|-----------|---------|----------------|
| 2,064,723 | Benge   | Dec. 15, 1936  |
| 2,092,571 | Cole    | Sept. 7, 1937  |
| 2,356,435 | Sarazin | Aug. 22, 1944  |
| 2,378,592 | Specht  | June 19, 1945  |

FOREIGN PATENTS

| Number  | Country       | Date           |
|---------|---------------|----------------|
| 398,416 | Great Britain | Sept. 14, 1933 |
| 773,520 | France        | Sept. 3, 1934  |